(12) United States Patent
Senkiw

(10) Patent No.: US 6,689,262 B2
(45) Date of Patent: Feb. 10, 2004

(54) MICROBUBBLES OF OXYGEN

(75) Inventor: James Andrew Senkiw, Minneapolis, MN (US)

(73) Assignee: Aqua Innovation, Inc., Bloomington, MN (US)

( * ) Notice: Subject to any disclaimer, the term of this patent is extended or adjusted under 35 U.S.C. 154(b) by 0 days.

(21) Appl. No.: 10/372,017

(22) Filed: Feb. 21, 2003

(65) Prior Publication Data

US 2003/0164306 A1 Sep. 4, 2003

Related U.S. Application Data

(60) Provisional application No. 60/358,534, filed on Feb. 22, 2002.

(51) Int. Cl.$^7$ .................................................. C25B 9/00
(52) U.S. Cl. ................. 204/278.5; 204/272; 204/275.1; 205/755; 205/756; 205/757; 205/758; 205/626; 205/628; 205/633; 205/701
(58) Field of Search ........................ 205/755, 756, 205/757, 758, 626, 628, 633, 701; 204/255, 256, 263, 266, 270, 272, 275.1, 278.5

(56) References Cited

U.S. PATENT DOCUMENTS

| | | | | |
|---|---|---|---|---|
| 3,975,269 A | * | 8/1976 | Ramirez | 210/707 |
| 4,012,319 A | * | 3/1977 | Ramirez | 210/707 |
| 4,732,661 A | * | 3/1988 | Wright | 204/278.5 |
| 4,908,109 A | * | 3/1990 | Wright | 210/703 |
| 5,049,252 A | * | 9/1991 | Murrell | 204/268 |
| 5,182,014 A | * | 1/1993 | Goodman | 209/164 |
| 5,534,143 A | * | 7/1996 | Portier et al. | 210/151 |
| 6,315,886 B1 | * | 11/2001 | Zappi et al. | 205/701 |
| 6,394,429 B2 | * | 5/2002 | Ganan-Calvo | 261/77 |
| 6,471,873 B1 | * | 10/2002 | Greenberg et al. | 210/748 |

FOREIGN PATENT DOCUMENTS

US   WO 95/21795   *   8/1995

* cited by examiner

Primary Examiner—Bruce F. Bell
(74) Attorney, Agent, or Firm—Kathleen R. Terry

(57) ABSTRACT

An oxygen emitter which is an electrolytic cell is disclosed. When the anode and cathode are separated by a critical distance, very small microbubbles and nanobubbles of oxygen are generated. The hydrogen forms bubbles at the cathode, which bubbles rise to the surface. The very small oxygen bubbles remain in suspension, forming a solution supersaturated in oxygen. The electrodes may be a metal or oxide of at least one metal selected from the group consisting of ruthenium, iridium, nickel, iron, rhodium, rhenium, cobalt, tungsten, manganese, tantalum, molybdenum, lead, titanium, platinum, palladium and osmium or oxides thereof. The electrodes may be formed into open grids or may be closed surfaces. The most preferred cathode is a stainless steel mesh. The most preferred mesh is a 1/16 inch grid. The most preferred anode is platinum and iridium oxide on a support. A preferred support is titanium. Models suitable for different uses are disclosed.

14 Claims, 5 Drawing Sheets

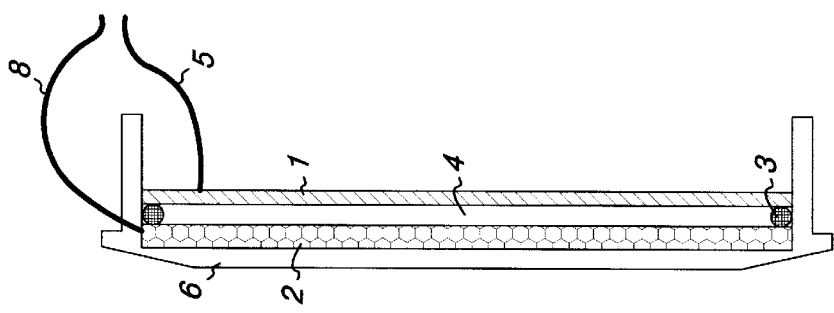
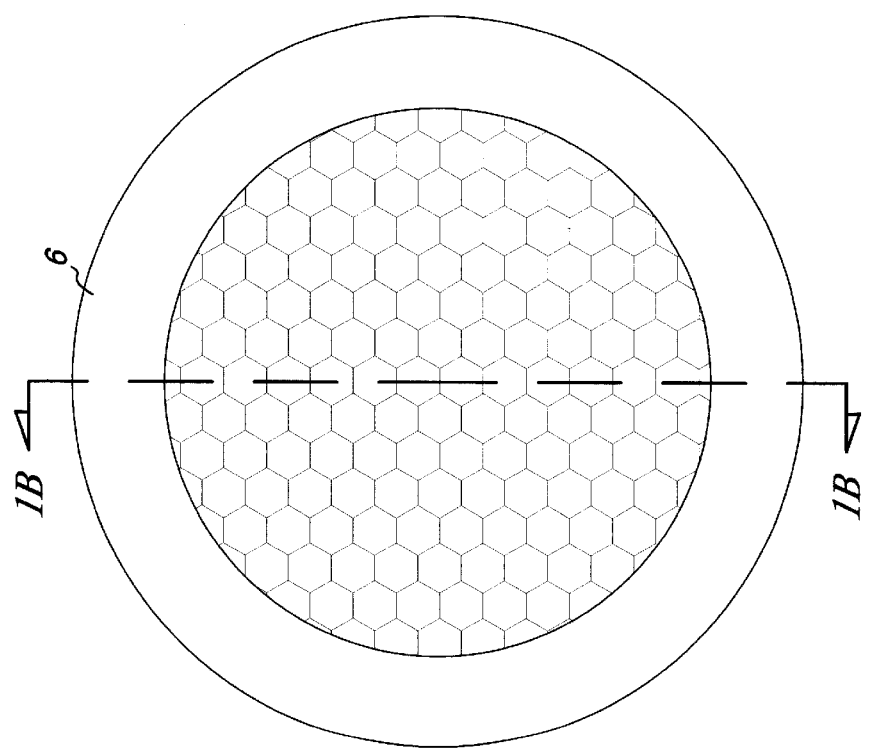

MICROBUBBLES OF OXYGEN

RELATED APPLICATIONS

This application claim the priority of U.S. Provisional Patent Application No. 60/358,534, filed Feb. 22, 2002.

FIELD OF THE INVENTION

This invention relates to the electrolytic generation of microbubbles of oxygen for increasing the oxygen content of aqueous media.

BACKGROUND OF THE INVENTION

Many benefits may be obtained through raising the oxygen content of aqueous media. Efforts have been made to achieve higher saturated or supersaturated oxygen levels for applications such as the improvement of water quality in ponds, lakes, marshes and reservoirs, the detoxification of contaminated water, culture of fish, shrimp and other aquatic animals, biological culture and hydroponic culture. For example, fish held in a limited environment such as an aquarium, a bait bucket or a live hold tank may quickly use up the dissolved oxygen in the course of normal respiration and are then subject to hypoxic stress, which can lead to death. A similar effect is seen in cell cultures, where the respiring cells would benefit from higher oxygen content of the medium. Organic pollutants from agricultural, municipal and industrial facilities spread through the ground and surface water and adversely affect life forms. Many pollutants are toxic, carcinogenic or mutagenic. Decomposition of these pollutants is facilitated by oxygen, both by direct chemical detoxifying reactions or by stimulating the growth of detoxifying microflora. Contaminated water is described as having an increased biological oxygen demand (BOD) and water treatment is aimed at decreasing the BOD so as to make more oxygen available for fish and other life forms.

The most common method of increasing the oxygen content of a medium is by sparging with air or oxygen. While this is a simple method, the resulting large bubbles produced simply break the surface and are discharged into the atmosphere. Attempts have been made to reduce the size of the bubbles in order to facilitate oxygen transfer by increasing the total surface area of the oxygen bubbles. U.S. Pat. No. 5,534,143 discloses a microbubble generator that achieves a bubble size of about 0.10 millimeters to about 3 millimeters in diameter. U.S. Pat. No. 6,394,429 discloses a device for producing microbubbles, ranging in size from 0.1 to 100 microns in diameter, by forcing air into the fluid at high pressure through a small orifice.

When the object of generating bubbles is to oxygenate the water, either air, with an oxygen content of about 21%, or pure oxygen may be used. The production of oxygen and hydrogen by the electrolysis of water is well known. A current is applied across an anode and a cathode which are immersed in an aqueous medium. The current may be a direct current from a battery or an AC/DC converter from a line. Hydrogen gas is produced at the cathode and oxygen gas is produced at the anode. The reactions are:

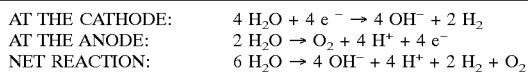

| AT THE CATHODE: | $4 H_2O + 4 e^- \rightarrow 4 OH^- + 2 H_2$ |
| AT THE ANODE: | $2 H_2O \rightarrow O_2 + 4 H^+ + 4 e^-$ |
| NET REACTION: | $6 H_2O \rightarrow 4 OH^- + 4 H^+ + 2 H_2 + O_2$ |

286 kilojoules of energy is required to generate one mole of oxygen.

The gasses form bubbles which rise to the surface of the fluid and may be collected. Either the oxygen or the hydrogen may be collected for various uses. The "electrolytic water" surrounding the anode becomes acidic while the electrolytic water surrounding the cathode becomes basic. Therefore, the electrodes tend to foul or pit and have a limited life in these corrosive environments.

Many cathodes and anodes are commercially available. U.S. Pat. No. 5,982,609 discloses cathodes comprising a metal or metallic oxide of at least one metal selected from the group consisting of ruthenium, iridium, nickel, iron, rhodium, rhenium, cobalt, tungsten, manganese, tantalum, molybdenum, lead, titanium, platinum, palladium and osmium. Anodes are formed from the same metallic oxides or metals as cathodes. Electrodes may also be formed from alloys of the above metals or metals and oxides co-deposited on a substrate. The cathode and anodes may be formed on any convenient support in any desired shape or size. It is possible to use the same materials or different materials for both electrodes. The choice is determined according to the uses. Platinum and iron alloys ("stainless steel") are often preferred materials due to their inherent resistance to the corrosive electrolytic water. An especially preferred anode disclosed in U.S. Pat. No. 4,252,856 comprises vacuum deposited iridium oxide.

Holding vessels for live animals generally have a high population of animals which use up the available oxygen rapidly. Pumps to supply oxygen have high power requirements and the noise and bubbling may further stress the animals. The available electrolytic generators likewise have high power requirements and additionally run at high voltages and produce acidic and basic water which are detrimental to live animals. Many of the uses of oxygenators, such as keeping bait or caught fish alive, would benefit from portable devices that did not require a source of high power. The need remains for quiet, portable, low voltage means to oxygenate water.

SUMMARY OF THE INVENTION

This invention provides an oxygen emitter which is an electrolytic cell which generates very small microbubbles and nanobubbles of oxygen in an aqueous medium, which bubbles are too small to break the surface tension of the medium, resulting in a medium supersaturated with oxygen.

The electrodes may be a metal or oxide of at least one metal selected from the group consisting of ruthenium, iridium, nickel, iron, rhodium, rhenium, cobalt, tungsten, manganese, tantalum, molybdenum, lead, titanium, platinum, palladium and osmium or oxides thereof. The electrodes may be formed into open grids or may be closed surfaces. The most preferred cathode is a stainless steel mesh. The most preferred mesh is a $\frac{1}{16}$ inch grid. The most preferred anode is platinum and iridium oxide on a support. A preferred support is titanium.

In order to form microbubbles and nanobubbles, the anode and cathode are separated by a critical distance. The critical distance ranges from 0.005 inches to 0.140 inches. The preferred critical distance is from 0.045 to 0.060 inches.

Models of different size are provided to be applicable to various volumes of aqueous medium to be oxygenated. The public is directed to choose the applicable model based on volume and power requirements of projected use. Those models with low voltage requirements are especially suited to oxygenating water in which animals are to be held.

Controls are provided to regulate the current and timing of electrolysis.

DESCRIPTION OF THE DRAWINGS

FIG. 1 is the $O_2$ emitter of the invention.

DETAILED DESCRIPTION OF THE INVENTION

Definitions:

For the purpose of describing the present invention, the following terms have these meanings:

"Critical distance" means the distance separating the anode and cathode at which evolved oxygen forms microbubbles and nanobubbles.

"$O_2$ emitter" means a cell comprised of at least one anode and at least one cathode separated by the critical distance.

"Metal" means a metal or an alloy of one or more metals.

"Microbubble" means a bubble with a diameter less than 50 microns.

"Nanobubble" means a bubble with a diameter less than that necessary to break the surface tension of water. Nanobubbles remain suspended in the water, giving the water an opalescent or milky appearance.

"Supersaturated" means oxygen at a higher concentration than normal calculated oxygen solubility at a particular temperature and pressure.

"Water" means any aqueous medium with resistance less than one ohm per square centimeter; that is, a medium that can support the electrolysis of water. In general, the lower limit of resistance for a medium that can support electrolysis is water containing more than 2000 ppm total dissolved solids.

The present invention produces microbubbles and nanobubbles of oxygen via the electrolysis of water. As molecular oxygen radical (atomic weight 8) is produced, it reacts to form molecular oxygen, $O_2$. In the special dimensions of the invention, as explained in more detail in the following examples, $O_2$ forms bubbles which are too small to break the surface tension of the fluid. These bubbles remain suspended indefinitely in the fluid and, when allowed to build up, make the fluid opalescent or milky. Only after several hours do the bubbles begin to coalesce on the sides of the container and the water clears. During that time, the water is supersaturated with oxygen. In contrast, the $H_2$ formed readily coalesces into larger bubbles which are discharged into the atmosphere, as can be seen by bubble formation at the cathode.

The first objective of this invention was to make an oxygen emitter with low power demands, low voltage and low current for use with live animals. For that reason, a small button emitter was devised. The anode and cathode were set at varying distances. It was found that electrolysis took place at very short distances before arcing of the current occurred. Surprisingly, at slightly larger distances, the water became milky and no bubbles formed at the anode, while hydrogen continued to be bubbled off the cathode. At distance of 0.140 inches between the anode and cathode, it was observed that the oxygen formed bubbles at the anode. Therefore, the critical distance for microbubble and nanobubble formation was determined to be between 0.005 inches and 0.140 inches.

EXAMPLE 1

Oxygen Emitter

Figure 2A:
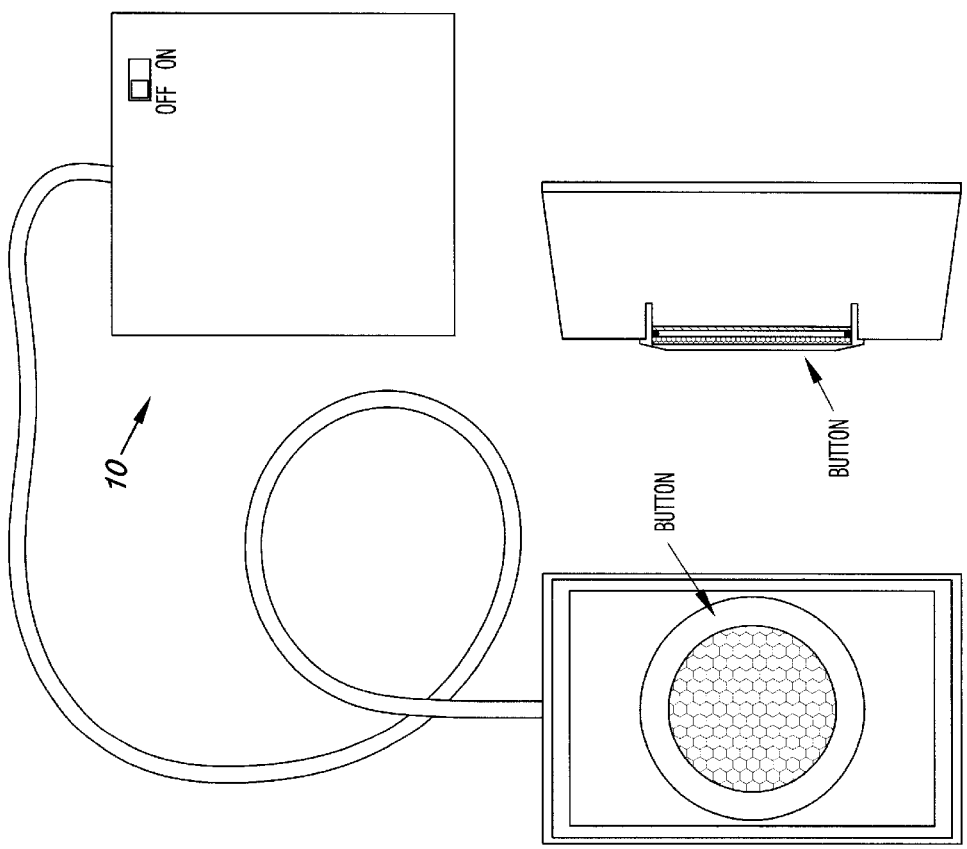
FIG. 2 is an assembled device.
Figure 2B:
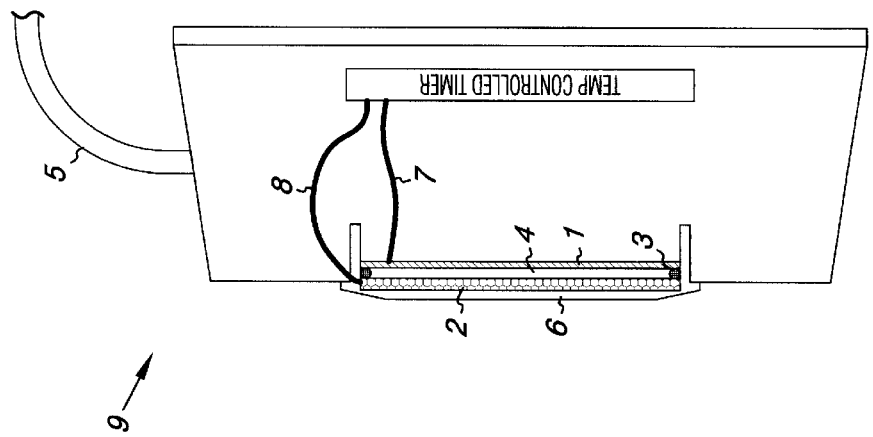

As shown in FIG. 1, the oxygen evolving anode 1 selected as the most efficient is an iridium oxide coated single sided sheet of platinum on a support of titanium (Eltech, Fairport Harbor, Ohio). The cathode 2 is a 1/16 inch mesh marine stainless steel screen. The anode and cathode are separated by a non-conducting spacer 3 containing a gap 4 for the passage of gas and mixing of anodic and cathodic water and connected to a power source through a connection point 5. FIG. 2 shows a plan view of the assembled device. The $O_2$ emitter 6 with the anode connecting wire 7 and the cathode connecting wire 8 is contained in an enclosure 9, connected to the battery compartment 10. The spacer thickness is critical as it sets the critical distance. It must be of sufficient thickness to prevent arcing of the current, but thin enough to separate the electrodes by no more than 0.140 inches. Above that thickness, the power needs are higher and the oxygen bubbles formed at higher voltage will coalesce and escape the fluid. Preferably, the spacer is from 0.005 to 0.075 inches thick. At the lower limits, the emitter tends to foul more quickly. Most preferably, the spacer is about 0.050 inches thick. The spacer may be any nonconductive material such as nylon, fiberglass, Teflon® polymer or other plastic. Because of the criticality of the space distance, it is preferable to have a non-compressible spacer. It was found that Buna, with a durometer measure of 60 was not acceptable due to decomposition. Viton, a common fluoroelastomer, has a durometer measure of 90 and was found to hold its shape well.

In operation, a small device with an $O_2$ emitter 1.485 inches in diameter was driven by 4AA batteries. The critical distance was held at 0.050 inches with a Viton spacer. Five gallons of water became saturated in seven minutes. This size is suitable for raising oxygen levels in an aquarium or bait bucket.

Figure 3:
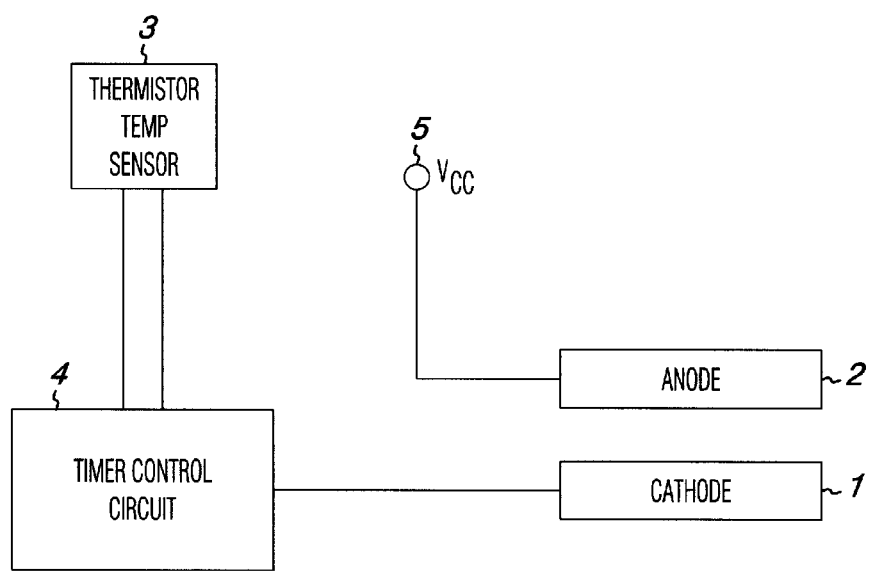
FIG. 3 is a diagram of the electronic controls of the $O_2$ emitter.

It is convenient to attach a control circuit which comprises a timer that is thermostatically controlled by a temperature sensor which determines the off time for the cathode. When the temperature of the solution changes, the resistance of the thermistor changes, which causes an off time of a certain duration. In cool water, the duration is longer so in a given volume, the emitter generates less oxygen. When the water is warmer and therefore hold less oxygen, the duration of off time is shorter. Thus the device is self-controlled to use power most economically. FIG. 3 shows a block diagram of a timer control with anode 1, cathode 2, thermistor temperature sensor 3, timer control circuit 4 and wire from a direct current power source 5.

EXAMPLE 2

Measurement of $O_2$ Bubbles

Attempts were made to measure the diameter of the $O_2$ bubbles emitted by the device of Example 1. In the case of particles other than gasses, measurements can easily be made by scanning electron microscopy, but gasses do not survive electron microscopy. Large bubble may be measured by pore exclusion, for example, which is also not feasible when measuring a gas bubble. A black and white digital, high contrast, backlit photograph of treated water with a millimeter scale reference was shot of water produced by the emitter of Example 1. About 125 bubbles were seen in the area selected for measurement. Seven bubbles ranging from the smallest clearly seen to the largest were measured. The area was enlarged, giving a scale multiplier of 0.029412.

Recorded bubble diameters at scale were 0.16, 0.22, 0.35, 0.51, 0.76, 0.88 and 1.09 millimeters. The last three were considered outlines by reverse analysis of variance and were assumed to be hydrogen bubbles. When multiplied by the scale multiplier, the assumed $O_2$ bubbles were found to range from 4.7 to 15 microns in diameter. This test was limited by the resolution of the camera and smaller bubbles in the nanometer range could not be resolved. It is known that white light cannot resolve features in the nanometer size range, so monochromatic laser light may give resolution sensitive enough to measure smaller bubbles. Efforts continue to increase the sensitivity of measurement so that sub-micron diameter bubbles can be measured.

EXAMPLE 3

Other Models of Oxygen Emitter

Figure 4:
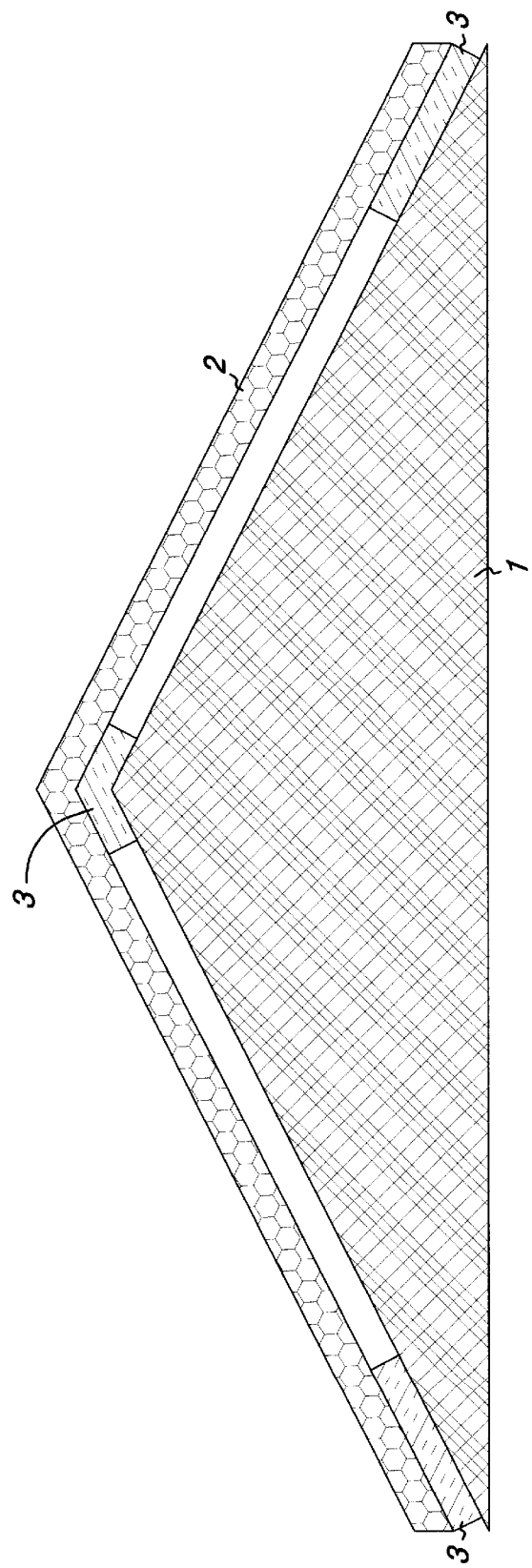
FIG. 4 shows a funnel or pyramid variation of the $O_2$ emitter.

Depending on the volume of fluid to be oxygenated, the oxygen emitter of this invention may be shaped as a circle, rectangle, cone or other model. One or more may be set in a substrate that may be metal, glass, plastic or other material. The substrate is not critical as long as the current is isolated to the electrodes by the nonconductor spacer material of a thickness from 0.005 to 0.075 inches, preferably 0.050 inches. It has been noticed that the flow of water seems to be at the periphery of the emitter, while the evolved visible bubbles ($H_2$) arise at the center of the emitter. Therefore, a funnel or pyramidal shaped emitter was constructed to treat larger volumes of fluid. FIG. 4 is a cross sectional diagram of such an emitter. The anode 1 is formed as an open grid separated from a marine grade stainless steel screen cathode 2 by the critical distance by spacer 3 around the periphery of the emitter and at the apex. This flow-through embodiment is suitable for treating large volumes of water rapidly.

The size may be varied as required. A round emitter for oxygenating a bait bucket may be about 2 inches in diameter, while a 3-inch diameter emitter is adequate for oxygenating a 10 to 40 gallon tank. The live well of a fishing boat will generally hold 40 to 80 gallons of water and require a 4-inch diameter emitter. It is within the scope of this invention to construct larger emitters or to use several in a series to oxygenate larger volumes. It is also within the scope of this invention to vary the model to provide for low voltage and amperage in cases where the need for oxygen is moderate and long lasting or conversely, to supersaturate water very quickly at higher voltage and amperage. In the special dimensions of the present invention, it has been found that a 6 volt battery supplying a current as low as 40 milliamperes is sufficient to generate oxygen. Such a model is especially useful with live plants or animals, while it is more convenient for industrial use to use a higher voltage and current. Table I shows a number of models suitable to various uses.

TABLE I

| Emitter Model | Gallons | Volts | Amps Max. | Ave | Watts |
| --- | --- | --- | --- | --- | --- |
| Bait keeper | 5 | 6 | 0.090 | 0.060 | 0.36 |
| Livewell | 32 | 12 | 0.180 | 0.120 | 1.44 |
| OEM 2 inch | 10 | 12 | 0.210 | 0.120 | 1.44 |
| Bait store | 70 | 12 | 0.180 | 0.180 | 2.16 |
| Double cycle | 2 | 12 | 0.180 | 0.180 | 2.16 |
| OEM 3 inch | 50 | 12 | 0.500 | 0.265 | 3.48 |
| OEM 4 inch | 80 | 12 | 0.980 | 0.410 | 4.92 |
| Water pail | 2 | 24 | 1.200 | 1.200 | 28.80 |
| Plate | 250 | 12 | 5.000 | 2.500 | 30.00 |

EXAMPLE 4

Multilayer Sandwich $O_2$ Emitter

Figure 5A:
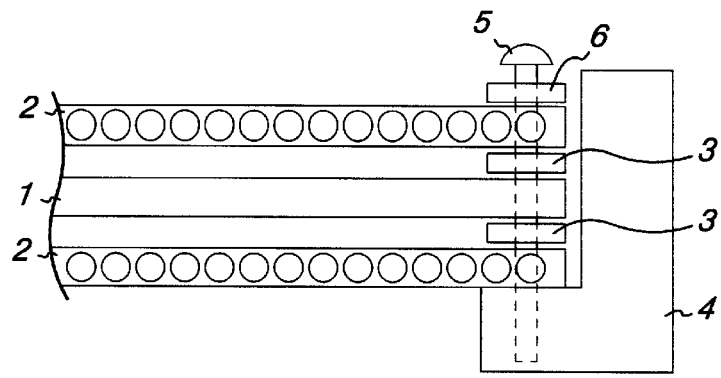
FIG. 5 shows a multilayer sandwich $O_2$ emitter.
Figure 5B:
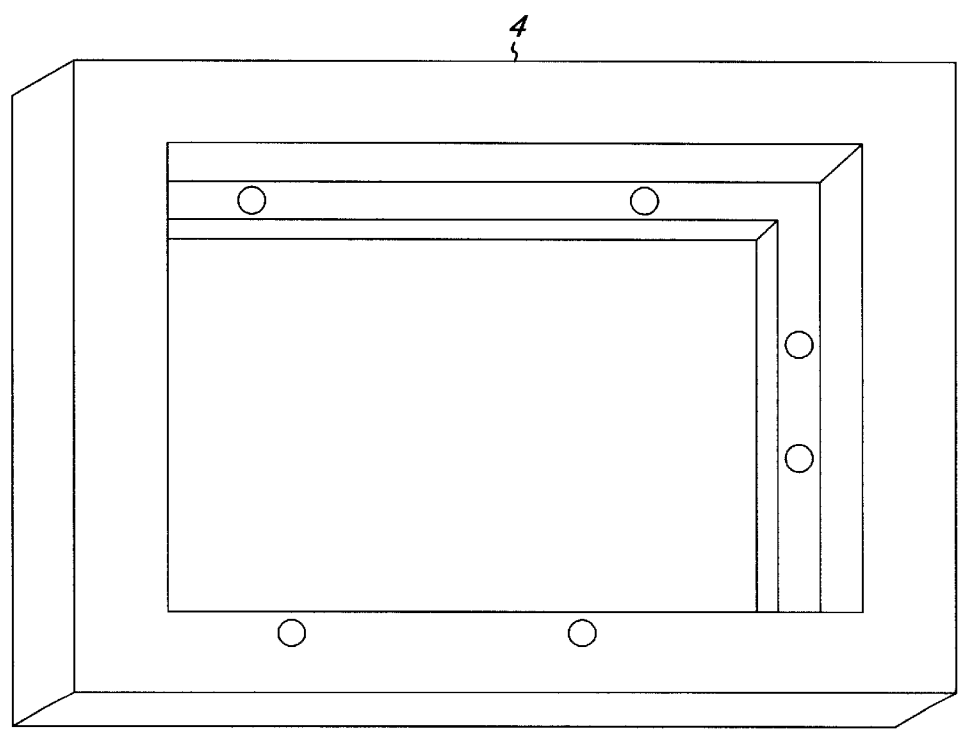

An $O_2$ emitter was made in a multilayer sandwich embodiment. (FIG. 5) An iridium oxide coated platinum anode 1 was formed into a grid to allow good water flow and sandwiched between two stainless steel screen cathodes 2. Spacing was held at the critical distance by nylon spacers 3. The embodiment illustrated is held in a cassette 4 which is secured by nylon bolt 5 with a nylon washer 6. The dimensions selected were:

| | |
| --- | --- |
| cathode screen | 0.045 inches thick |
| nylon spacer | 0.053 inches thick |
| anode grid | 0.035 inches thick |
| nylon spacer | 0.053 inches thick |
| cathode screen | 0.045 inches thick, | for an overall emitter thickness of 0.231 inches.

If a more powerful emitter is desired, it is within the scope of this invention to repeat the sequence of stacking. For example, an embodiment may easily be constructed with this sequence: cathode, spacer, anode, spacer, cathode, spacer, anode, spacer, cathode, spacer, anode, spacer, cathode. The number of layers in the sandwich is limited only by the power requirements acceptable for an application.

Those skilled in the art will readily comprehend that variations, modifications and additions may in the embodiments described herein may be made. Therefore, such variations, modifications and additions are within the scope of the appended claims.

I claim:

1. An emitter for electrolytic generation of microbubbles of oxygen comprising an anode separated at a critical distance from a cathode and a power source all in electrical communication with each other.

2. The emitter of claim 1 wherein the anode is a metal or a metallic oxide or a combination of a metal and a metallic oxide.

3. The emitter of claim 1 wherein the anode is platinum and iridium oxide on a support.

4. The emitter of claim 1 wherein the cathode is a metal or metallic oxide or a combination of a metal and a metallic oxide.

5. The critical distance of claim 1 which is 0.005 to 0.140 inches.

6. The critical distance of claim 1 which is 0.045 to 0.060 inches.

7. A method for lowering the biologic oxygen demand of polluted water comprising passing the polluted water through a vessel containing the emitter of claim 1.

8. The product of claim 1 wherein the water is supersaturated with oxygen and of an approximately neutral pH.

9. An emitter for electrolytic generation of microbubbles of oxygen comprising a plurality of anodes separated at a critical distance from a plurality of cathodes and a power source all in electrical communication with each other.

10. A method for keeping aquatic animals emitter alive comprising inserting the emitter of claim 1 or claim 9 into the aquatic medium of the aquatic animals.

11. The method of claim 8 wherein the aquatic animal is a fish.

12. The method of claim 8 wherein the aquatic animal is a shrimp.

13. An emitter for electrolytic generation of microbubbles of oxygen comprising a platinum-iridium oxide anode on a titanium support separated at a critical distance of from 0.045 inches to 0.060 inches from a stainless steel screen 1/16 inch thick cathode all in electrical communication with a battery.

14. The emitter of claims 1, 9 or 13 further comprising a timer control.

* * * * *